US012659002B2

(12) United States Patent
Pezeshki et al.

(10) Patent No.: US 12,659,002 B2
(45) Date of Patent: Jun. 16, 2026

(54) USER EQUIPMENT INDICATION OF ASSISTANCE INFORMATION IN BLOCKAGE PREDICTION REPORT

(71) Applicant: QUALCOMM Incorporated, San Diego, CA (US)

(72) Inventors: Hamed Pezeshki, San Diego, CA (US); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 17/840,444

(22) Filed: Jun. 14, 2022

(65) Prior Publication Data

US 2023/0403062 A1 Dec. 14, 2023

(51) Int. Cl.
| | |
|---|---|
| *H04B 7/06* | (2006.01) |
| *H04B 17/373* | (2015.01) |
| *H04W 4/02* | (2018.01) |

(52) U.S. Cl.
CPC ......... *H04B 7/0695* (2013.01); *H04B 17/373* (2015.01); *H04W 4/027* (2013.01)

(58) Field of Classification Search
CPC ........................... H04B 7/0695; H04B 17/373; H04B 7/06952; H04B 7/0408; H04B 7/088; H04B 17/328; H04L 1/12; H04L 1/1671; H04L 2001/0097; H04L 1/0076; H04L 1/06; H04L 1/0075; H04W 4/027; H04W 24/08; H04W 24/10; G06N 3/08
See application file for complete search history.

(56) References Cited

U.S. PATENT DOCUMENTS

| | | | | |
|---|---|---|---|---|
| 2020/0221323 | A1* | 7/2020 | Xu | H04L 5/0025 |
| 2020/0259575 | A1* | 8/2020 | Bai | H04B 17/24 |
| 2021/0184748 | A1 | 6/2021 | Luo et al. | |
| 2023/0370181 | A1* | 11/2023 | Rydén | H04B 17/336 |

FOREIGN PATENT DOCUMENTS

WO 2022006410 A1 1/2022

OTHER PUBLICATIONS

International Search Report and Written Opinion—PCT/US2023/067177—ISA/EPO—Sep. 5, 2023.

* cited by examiner

*Primary Examiner* — Marcos L Torres
(74) *Attorney, Agent, or Firm* — Patterson + Sheridan, L.L.P.

(57) ABSTRACT

Certain aspects of the present disclosure provide a method of wireless communication by a user equipment (UE), generally including communicating with a network entity using one or more beams and transmitting, to the network entity, assistance information based on a predicted future blockage event involving at least one of the one or more beams.

20 Claims, 10 Drawing Sheets

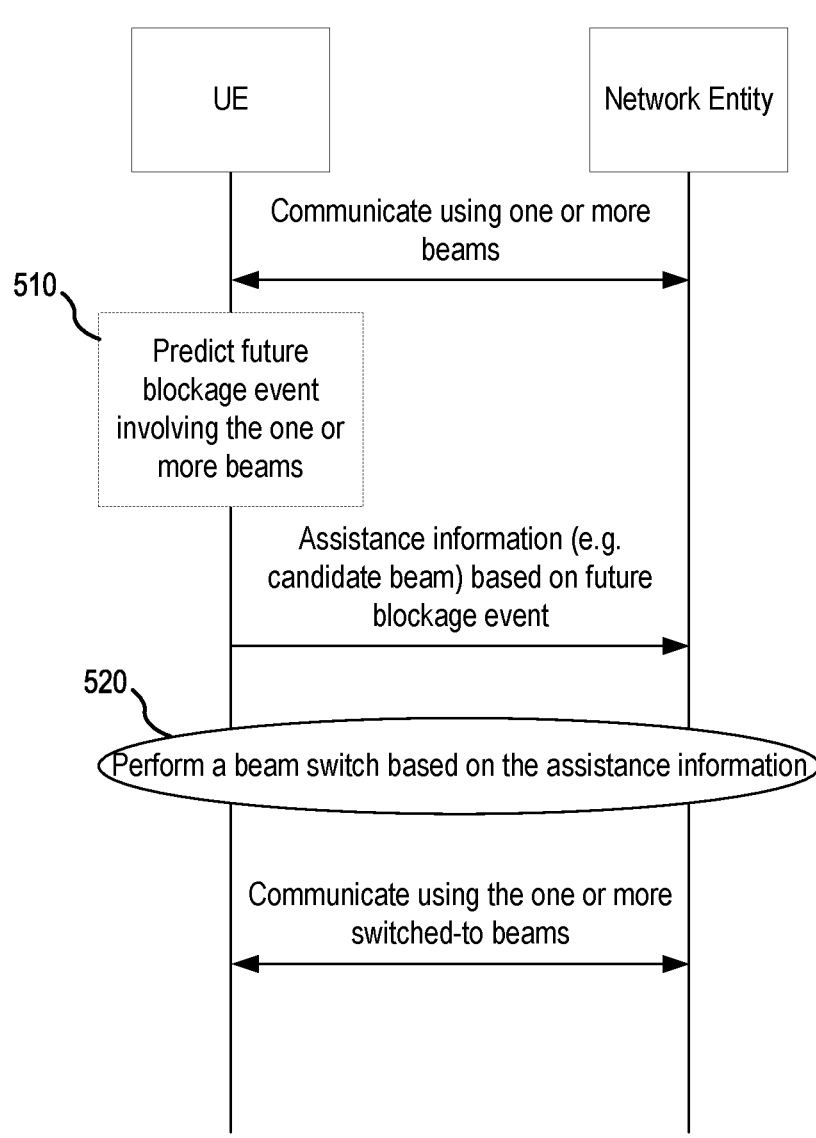
*FIG. 5*

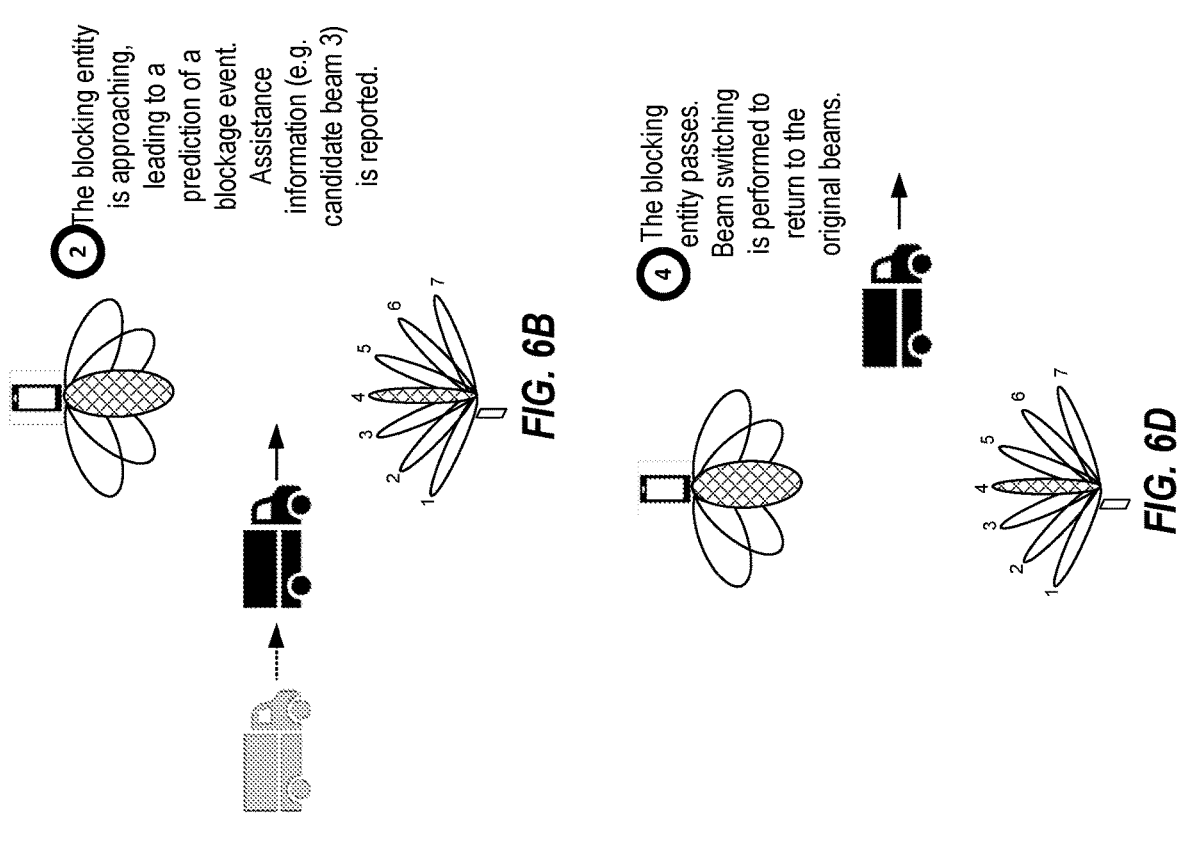
② The blocking entity is approaching, leading to a prediction of a blockage event. Assistance information (e.g. candidate beam 3) is reported.
*FIG. 6B*
① A blocking entity enters the vicinity.
*FIG. 6A*
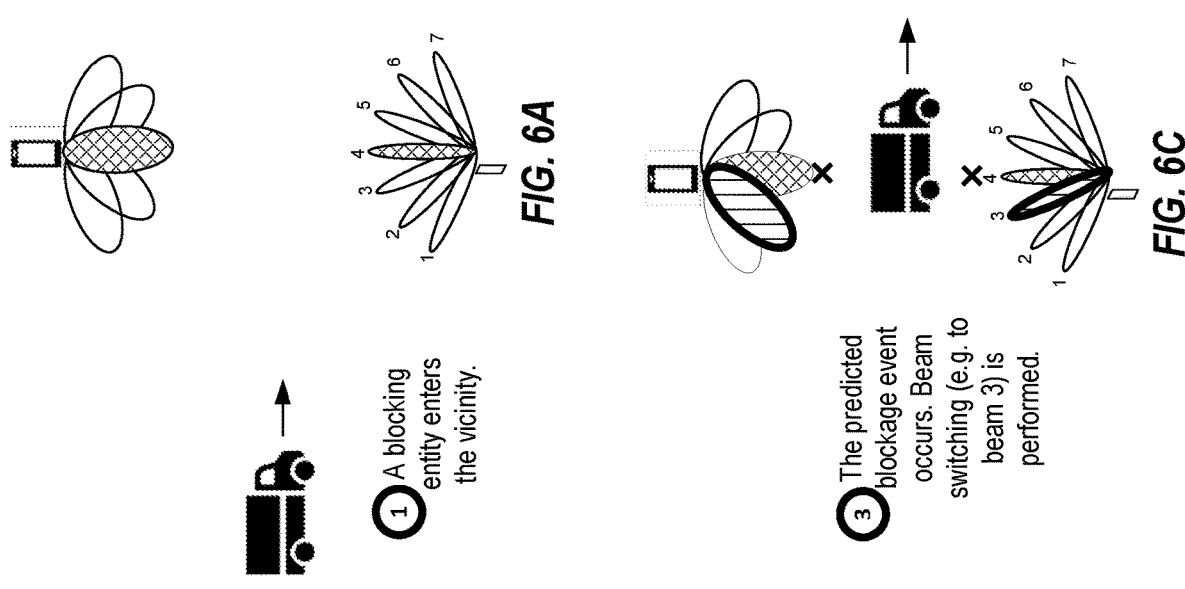
④ The blocking entity passes. Beam switching is performed to return to the original beams.
*FIG. 6D*
③ The predicted blockage event occurs. Beam switching (e.g. to beam 3) is performed.
*FIG. 6C*

700

A method of wireless communications by a UE

Communicate with a network entity using one or more beams

705

Transmit, to the network entity, assistance information based on a predicted future blockage event involving at least one of the one or more beams

710

800

A method of wireless communications by a network entity

Communicate with a UE using one or more beams

805

Receive, from the UE, assistance information based on a predicted future blockage event involving at least one of the one or more beams

810

USER EQUIPMENT INDICATION OF ASSISTANCE INFORMATION IN BLOCKAGE PREDICTION REPORT

BACKGROUND

Field of the Disclosure

Aspects of the present disclosure relate to wireless communications, and more particularly, to techniques for providing user equipment (UE) indication of assistance information in blockage prediction report.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes communicating with a network entity using one or more beams; and transmitting, to the network entity, assistance information based on a predicted future blockage event involving at least one of the one or more beams.

Another aspect provides a method of wireless communications by a network entity. The method includes communicating with a UE using one or more beams; and receiving, from the UE, assistance information based on a predicted future blockage event involving at least one of the one or more beams.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein;

a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 5 depicts an example call flow diagram for a user equipment (UE) indication of assistance information in a blockage prediction report, in accordance with aspects of the present disclosure.

FIGS. 6A, 6B, 6C, and 6D depict an example of a blockage scenario that may be predicted by a UE and indicated in a blockage prediction report, in accordance with aspects of the present disclosure.

DETAILED DESCRIPTION

Aspects of the present disclosure provide apparatuses, methods, processing systems, and computer-readable mediums for user equipment (UE) indication of assistance information in blockage prediction report.

Advanced wireless systems (e.g., 5G NR) utilize higher frequencies (e.g., mmWave) with numerous antennas to perform beamforming. Beamforming generally refers to signal processing techniques that allows a network entity (e.g., a base station) to transmit using directional beams that target an intended recipient (e.g., a UE). Beamforming may help make efficient use of frequency resources by reducing interference by controlling transmit directions.

Unfortunately, one potential hazard associated with beamforming is blockage. Blockage generally refers to a scenario where a blocking entity (e.g., a moving object such as a vehicle, a stationary object such as a building, or another type of blocking object is present in a beam path, which can suddenly interrupt communications and result in a beam failure. To detect a beam failure, a UE typically measures beam failure detection (BFD) reference signals (BFD-RSs) and determines whether a beam failure trigger condition is satisfied (e.g., based on defined criteria). If a beam failure is detected, a beam failure recovery (BFR) process may be performed, with the UE sending a beam failure recovery request (BFRQ) to the network entity.

There are various potential issues with existing BFR procedure. One potential issue is that the existing BFR procedure involving a BFRQ from the UE is reactive. In other words, the beam failure event happens first and then the UE reacts by transmitting a BFRQ to initiate the BFR procedure.

Aspects of the present disclosure, however, provide for a UE to predict an imminent beam blockage event and proactively indicate this prediction to the network entity. As will be described in greater detail below, the UE may indicate information, such as a set of candidate beams that could be better alternatives (e.g., less likely to be subject to blockage) during the predicted beam block blockage event. This information may assist the UE and network entity in avoiding and/or reducing future beam blockage events. As a result, system performance may improve and interruption in service to perform BFRs may be reduced or avoided.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
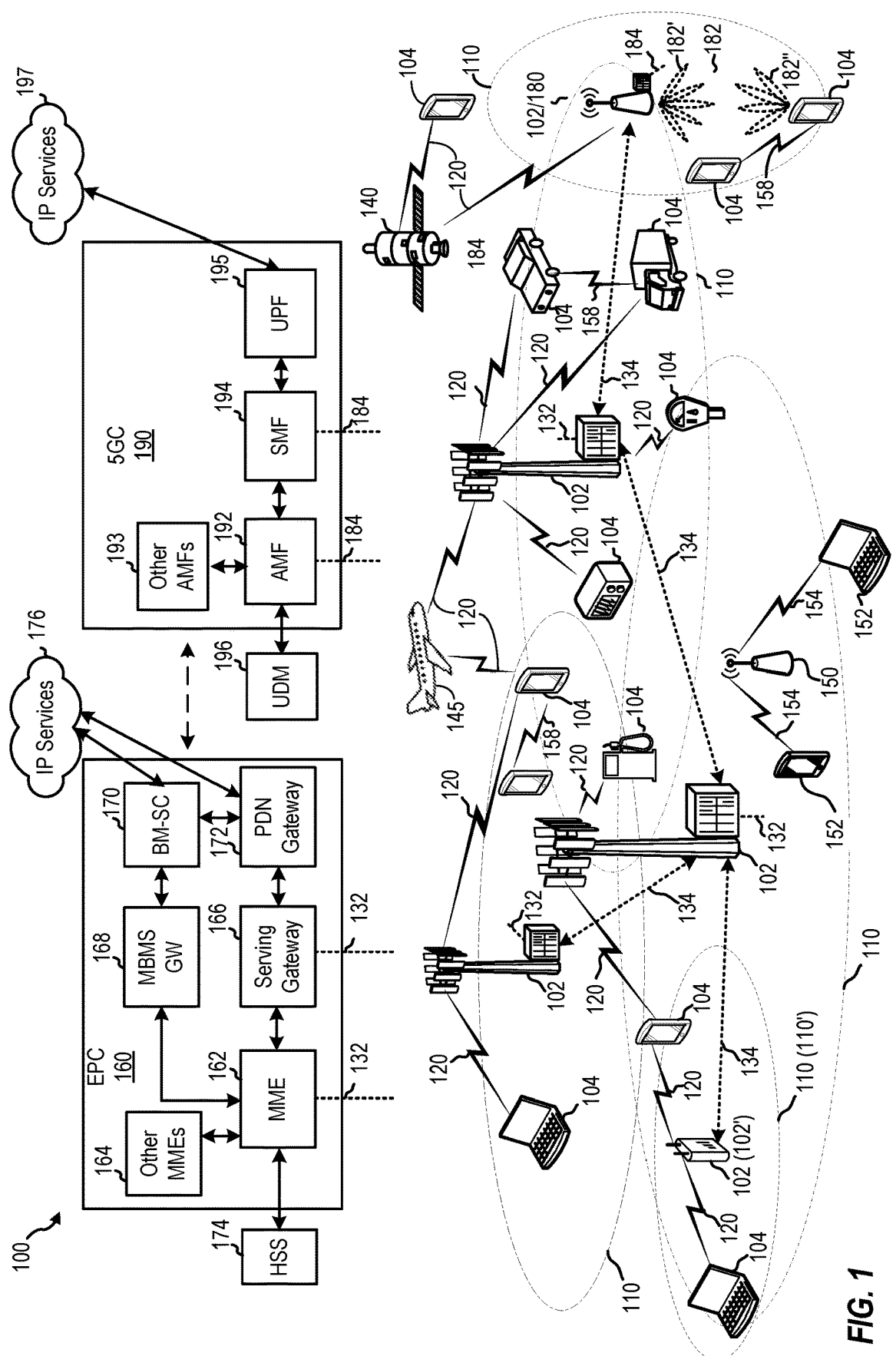
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
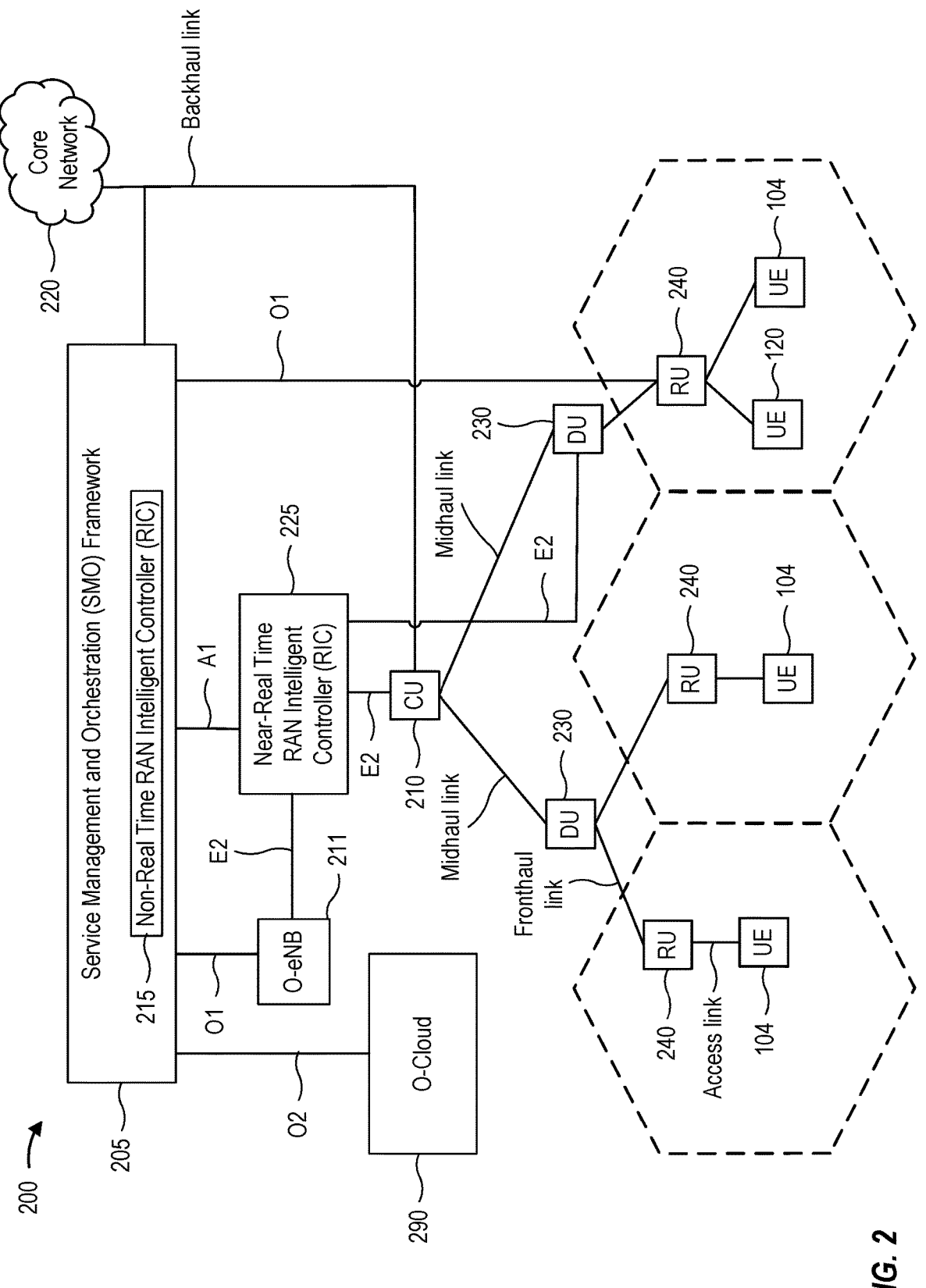
FIG. 2 depicts an example disaggregated network entity architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium.

Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
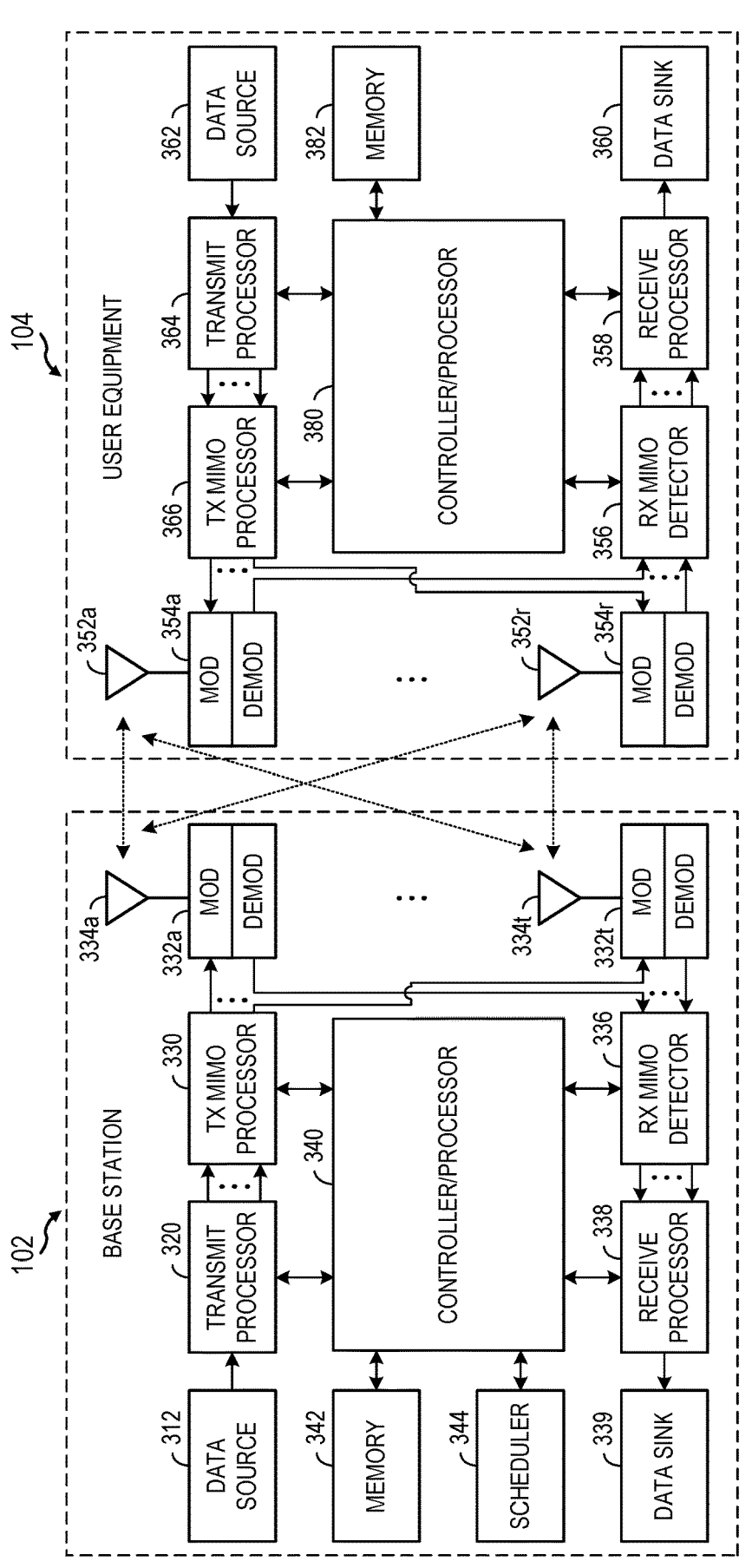
FIG. 3 depicts aspects of an example network entity and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
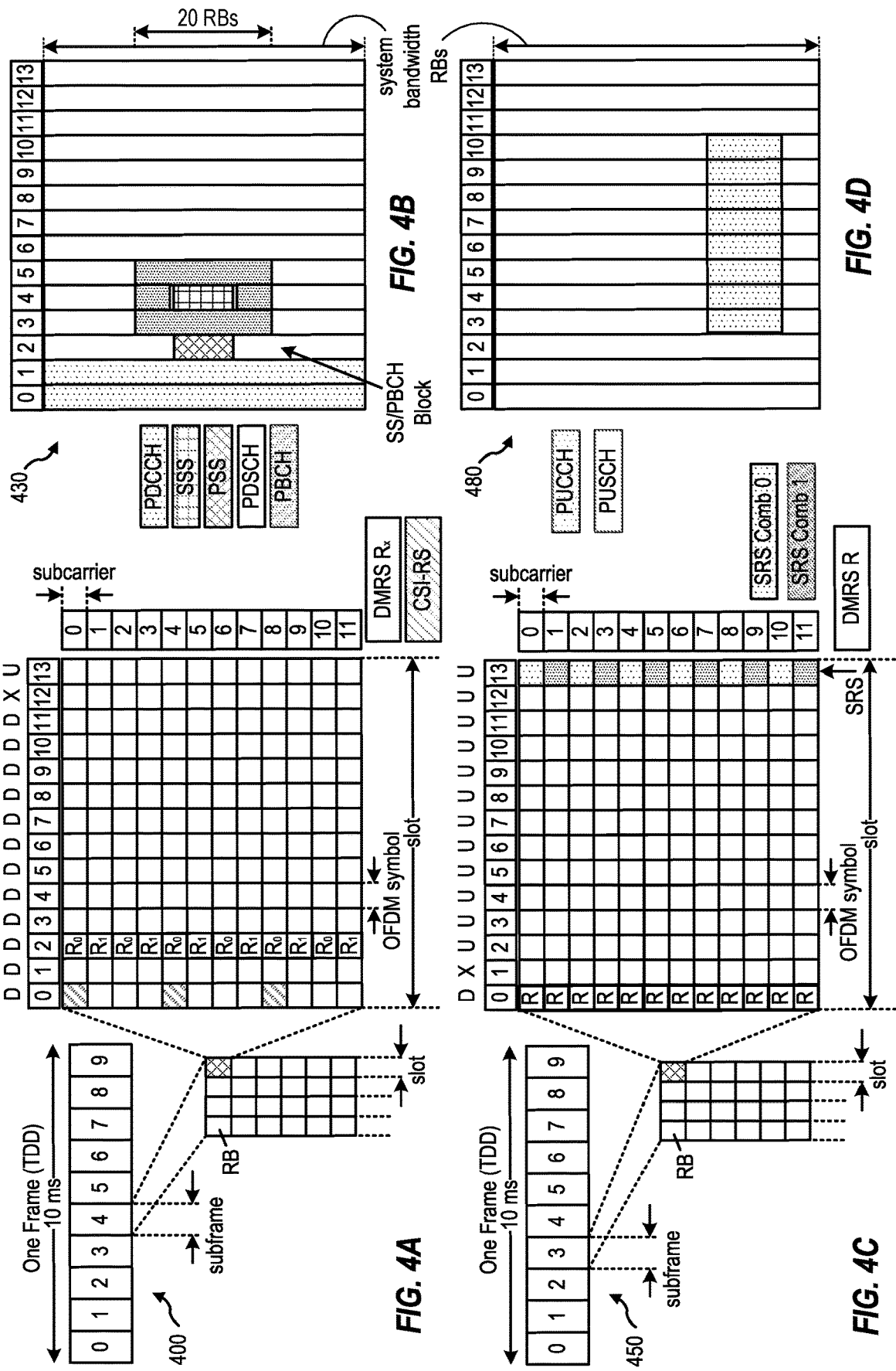
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIG. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}\times15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the network entity (e.g., base station). The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a network entity (e.g., base station) for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Beam Failure Detection and Recovery Procedures

Beamforming is the application of multiple radiating elements transmitting the same signal at an identical wavelength and phase, which combine to create a single antenna with a longer, more targeted stream, formed by reinforcing waves in a particular direction. Increasing the number of radiating elements that make up the antenna narrows the resulting beam. The signal processing technique known as beamforming allows gNB to send targeted beams of data to users, reducing interference and using the frequency spectrum with increased efficiency.

Beamforming may be achieved by changing the phase of the input signal on all radiating elements. Phase shifting allows the signal to be aimed in a particular direction and/or targeted at a specific receiver. The direction a signal is sent in is configured dynamically by the network entity (e.g., base station) as the endpoint moves in order to effectively track the user. If a beam is unable to track a user, the endpoint may switch to a different beam.

5G base stations (e.g. gNB) may perform beam sweeping by using a different downlink (DL) beam for each synchronization signal block (SSB). A user equipment (UE) will then detect the best beam from the gNB and inform the gNB of the selection by using a specific Physical Random Access Channel (PRACH) resource mapped to each DL beam.

In certain scenarios, the radio link between the UE and gNB is susceptible to blockage and degradation of radio frequency (RF) signal, which can interrupt the communication link, resulting in beam failure. A UE may be configured with a mechanism to measure sudden or rapid changes in the communication link to detect beam failures and allow recovery.

As noted above, for beam failure detection (BFD), a UE measures BFD-RS, such as Periodic Channel State Information Reference Signal (P-CSI-RS) or SSBs Quasi Co Located (QCL'd) with Physical downlink control channel (PDCCH) demodulation reference signals (DMRS). Based on the BFD-RS measurements, the UE may determine whether a beam failure trigger condition is satisfied.

In some cases, when reporting a BFD, the UE may identify a new candidate beam (to facilitate beam failure recovery). In some cases, a UE may try to find a new beam pair on which connectivity can be restored. To enable this, a UE may be configured with a resource set consisting of a set of P-CSI-RS, or alternatively a set of SSBs. In practice, each of these RSs is transmitted within a specific downlink beam. In this way, the resource set corresponds to a set of candidate beams.

In some cases, detection of a predefined number of Beam Failures (BFD instances) may trigger a BFR process with the candidate beam (PRACH), also known as a beam failure recovery request (BFRQ). The predefined number of beam failures to trigger this process may be defined by a parameter (e.g., beamFailureInstanceMaxCount) via radio resource control (RRC) signaling. In some cases, the gNB may respond to a BFRQ (RACH Response) via a Physical downlink control channel (PDCCH) scrambled by a Cell Radio Network Temporary Identifier (C-RNTI).

In a typical BFR procedure, the UE measures physical layer (Layer 1) reference signal received power (L1-RSRP) on the reference signals (RSs) corresponding to the set of candidate beams. If the L1-RSRP exceeds a certain configured target, the reference signal is assumed to correspond to a beam by means of which connectivity may be restored. In other words, this essentially makes L1-RSRP the metric for evaluating the candidate beams.

Aspects Related to UE Indication of Assistance Information in Blockage Prediction Report As previously noted, one potential issue with existing BFR procedures is that they are reactive, in that the beam failure event happens first and then the UE reacts by transmitting a BFRQ to initiate the BFR procedure. Aspects of the present disclosure, however, allow a UE to predict a beam blockage event and proactively indicate this prediction to the network entity (e.g., base station). In other words, over time a same beam may go from being unblocked to being blocked at some point and, later, back to being unblocked.

In some cases, the UE may indicate a set of candidate beams that would be better alternatives during the beam block blockage event (e.g., less likely to be subject to blockage). This information may provide the UE and network entity (e.g., base station) more visibility which may lead to avoiding and/or reducing future beam blockage events. As a result, system performance may improve and interruption in service to perform BFRs may be avoided.

The procedure proposed herein, for proactive beam blockage prediction by a UE may be understood with reference to the call flow diagram 500 of FIG. 5.

As illustrated, the UE may communicate with a network entity (e.g., a gNB or component of a disaggregated base station) using one or more beams. As illustrated, at 510, the UE may predict a future (e.g., imminent) beam blockage event involving one or more of the beams. Based on the prediction, the UE may proactively indicate this prediction to the network entity.

For example, the UE may transmit assistance information based on the predicted future blockage event. Based on the transmitted assistance information, at 520, the UE and network entity may perform a beam switch (e.g., to a candidate beam indicated via the assistance information) for subsequent communications.

FIGS. 6A-6D illustrate an example scenario, in which for proactive beam blockage prediction proposed herein may be beneficial to minimize the impact of a blocking entity passing between a UE and network entity. While the illustrated example involves a blocking entity moving in the path of beam pairs, similar blocking events could occur due to movement of the UE or, more generally, any relative movement between a UE and blocking entity that results in an obstructed path between a transmit and receive beam pair.

As illustrated in FIG. 6A, the UE and network entity are initially communicating via a network entity beam #4, as a blocking entity (e.g., a truck) enters the vicinity. As the blocking entity continues to approach, as illustrated in FIG. 6B, the UE may predict that the existing beam (network entity beam #4) is going to be blocked imminently.

Based on this prediction, the UE may indicate, to the network entity, that the (current) serving beam is going to be blocked and may indicate one or more candidate beams that may be (predicted to be) less impacted by the predicted blockage event. For example, as illustrated in FIG. 6B, given the blocking entity location and direction of travel, the UE may indicate beam 3 as a candidate beam.

In some cases the UE may also include additional information for the predicted candidate beams, such as respective predicted L1-RSRP values. Reporting predicted L1-RSRP values may lead to a better result than reporting current L1-RSRP values. For example, if only current L1-RSRP values were reported, network beams 5, 6, or 7 (currently not blocked) might be selected, even though those beams are likely to be blocked soon, given the blocking entity direction and trajectory. In contrast, while network beam 3 might have a lower L1-RSRP value than network beams 5, 6, or 7, its predicted L1-RSRP value is higher.

Thus, as shown in FIG. 6C, as the predicted blockage event occurs, the UE and network entity may switch to network beam 3. As illustrated, the UE may switch to a corresponding receive beam (essentially switching to a different transmit and receive beam pair).

Proactively switching to the beam pair with the predicted candidate beam may help avoid the disruption in service that would have occurred if the UE waited until the blockage event was actually detected and, subsequently, performed a BFR procedure.

As illustrated in FIG. 6D, as the blocking entity passes (and exits the vicinity), the UE and network entity may switch back to the original beam pair (with network entity beam 4) that was used before the blockage event was predicted.

As illustrated by the above example, a UE capable of predicting an imminent beam blockage event can proactively indicate this prediction to a network entity and either prevent or reduce imminent beam failure or accelerate beam failure recovery procedure. As noted above, predicted parameters (e.g., provided a UE assistance information in a blockage prediction report) may represent a new type of reported metric for candidate beams (rather than current L1-RSRP measurements), that may be utilized when deciding which candidate beam to select for communication in case of a predicted imminent blockage event. Such a metric may provide unique advantages, such as giving UE and gNB greatly increased visibility which could lead to avoiding (or reducing the adverse effects of) future beam blockage events.

In some cases, the assistance information provided with a blockage prediction report may indicate a probability that a given beam in the candidate set will be blocked (e.g., due to one or more blocking entities passing by). The probability may be computed for all or only some of the beams in the predicted candidate set indicated in the report. As indicated with reference to the example above, the probability that a given beam will be blocked may be calculated based, at least in part, on the trajectory of one or more blocking entities.

The probabilities may be reported with different granularity levels. For example, probabilities may be reported with values ranging from 0 to 1, with a value at or near 1 suggesting a UE has a high confidence that the given candidate beam is going to be blocked soon.

In some scenarios, a given candidate beam may have a high predicted reference signal received power (RSRP) for when the predicted blockage event will occur, but a high blockage probability for the candidate beam just after the currently predicted blockage event. To account for such scenarios, the network entity may configure the UE with a certain blockage probability threshold (e.g., in addition to L1-RSRP target). If the blockage probability for a candidate beam is larger than the threshold, the UE may not report the candidate beam, regardless of how high the predicted RSRP for that beam is for the predicted blockage event.

The assistance information accompanying the candidate beam set can include information regarding the trajectory of a blocking entity, such as an estimated moving direction of the UE relative to the blocking entity or an estimated velocity of the UE relative to the blocking entity. In some cases, the estimated direction of a blocking entity may be reported in terms of quantized standardized global directions (e.g., N, S, E, W, NW, NE, SW, and SE).

The moving direction of a blocking entity may be inferred at the UE through UE sensors (e.g., camera). For instance, a UE may be configured to analyze a series of consecutive images to infer the moving direction of a blocking entity.

As an alternative, the moving direction of a blocking entity may be inferred at the UE using RF measurements over time. In some cases, this inference may be performed using a machine learning (ML) algorithm. For example, this inference may be performed through training a neural network that takes, as input, the measurements of multiple gNB beams over time when a blocking entity passes by. The output of the neural network may be the direction of the blocking entity. Quantized directions may be inferred from camera input in the training phase or can be manually provided in offline training phase.

In some cases, a blocking entity moving between a UE and network entity (such as the truck depicted in FIGS. 6A-6D moving from left to right or from right to left) may provide different signatures in terms of gNB beam measurements over time. These different signatures may be utilized for the purpose of direction prediction. If a UE can predict the direction of a blocking entity early enough, it may be able to indicate this to the network, together with the predicted blockage report.

In some cases, the network entity may make beam switching decisions based on the assistance information provided in a predicted blockage report. Through association of beams to directions, a gNB may be able to avoid beams in the direction of a moving blocking entity. For example, if a blocking entity is moving towards the east, the UE may report this direction information and the gNB may choose not to use the beams that are pointed east when, for example, the serving line of sight (LOS) beam is about to be blocked. As a result, the gNB may not only avoid the predicted blockage event, but may also avoid potential future blockage events (that would have occurred) after the currently predicted blockage event.

In some cases, the assistance information may include information about a blocking entity. Such information may be sent per potential future blocking entity, for multiple blockers.

As an example of the types of information about a blocking entity that may be reported, the assistance information may include information about one or more of a size, shape, type, or height of a blocking entity. Such information may be inferred by analyzing camera images. The types of information reported may be defined (e.g., in a standard specification). In some cases, the size may be provide with a relatively coarse granularity, for example, in terms of small, medium, and large.

In some cases, the assistance information may include information about the velocity of one or more blocking entities. In such cases, the velocity may be provide with a relatively coarse granularity, for example, in terms of slow, medium, or fast. The estimated velocity of a blocking entity may be calculated by analyzing consecutive images of the blocker over a certain time window. The estimated velocity of a blocking entity may also be calculated by training a neural network that outputs estimated velocity after taking, as input, gNB beam measurements over a time window.

Example Operations of a User Equipment

Figure 7:
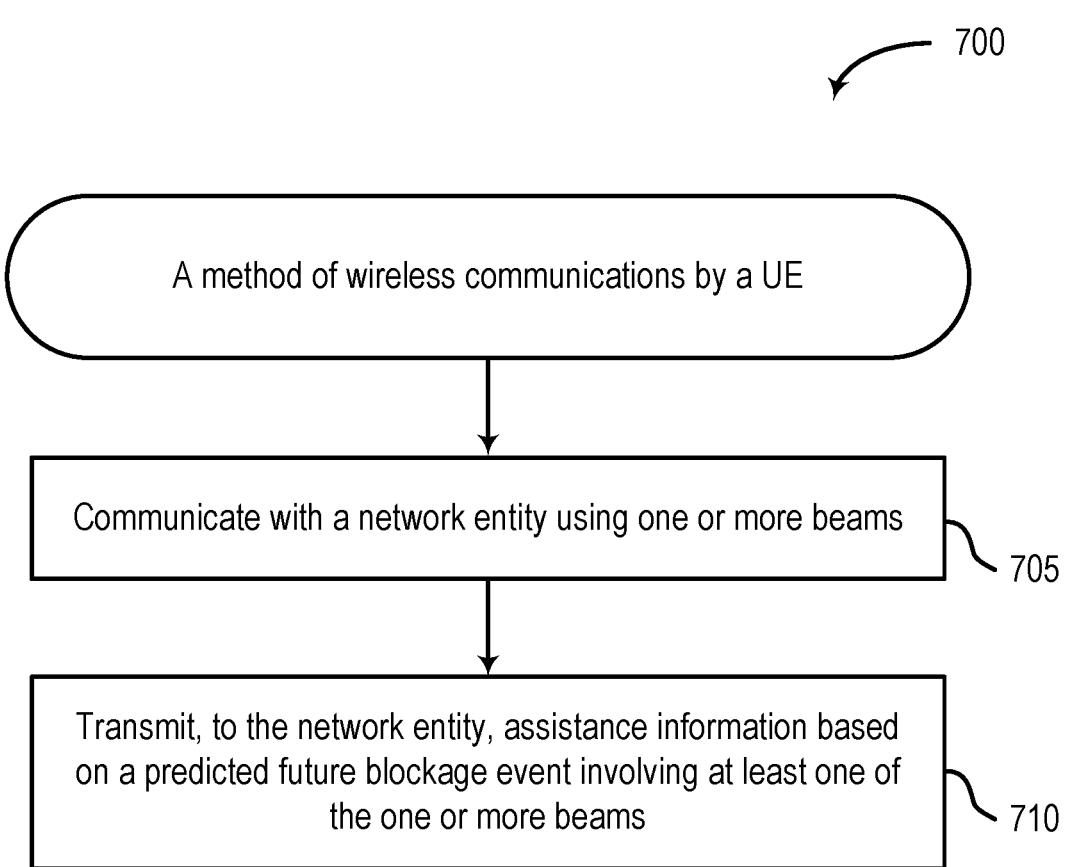
FIG. 7 depicts a method for wireless communications.

FIG. 7 shows a method 700 for wireless communications by a UE, such as UE 104 of FIGS. 1 and 3.

Method 700 begins at 705 with communicating with a network entity using one or more beams. In some cases, the operations of this step refer to, or may be performed by, communications circuitry as described with reference to FIG. 9.

Method 700 then proceeds to step 710 with transmitting, to the network entity, assistance information based on a predicted future blockage event involving at least one of the one or more beams. In some cases, the operations of this step refer to, or may be performed by, assistance information transmission circuitry as described with reference to FIG. 9.

In some aspects, the assistance information includes an indication of at least one candidate beam that is predicted to be less impacted by the predicted future blockage event than the at least one of the one or more beams associated with the predicted future blockage. In some aspects, the assistance information includes at least one of: a predicted RSRP for the at least one candidate beam; or a calculated blockage probability that the at least one candidate beam will be blocked in the future blockage event.

In some aspects, the method 700 further includes calculating a blockage probability for the at least one candidate beam. Blockage probability may be calculated, for example, based on an estimated moving direction and velocity of a blocking entity (and/or the UE). In some cases, other factors may be considered, such as a blocking entity size, shape, or type of candidate beams (including a serving beam). In some cases, blockage probability may be calculated based on predicted L1-RSRP of beams (including a serving beam) in one or more future time instances. In such cases, blockage probability for a given beam may be calculated by computing a probability that the predicted L1-RSRP for that beam will be less than a threshold for more than a threshold number of times in a given duration (e.g., of a prediction window). In some aspects, the method 700 further includes selecting the at least one candidate beam for inclusion in the assistance information based on the calculated blockage probability being less than or equal to a threshold. In some aspects, the threshold is configured by a network entity. For example, the network entity may configure the threshold via radio resource control (RRC) signaling that configures the UE for predicted blockage reporting.

In some aspects, the future blockage event involves movement of at least one blocking entity. In some aspects, the assistance information indicates at least one of: an estimated moving direction of the UE relative to the blocking entity; or an estimated velocity of the UE relative to the blocking entity. Alternatively, the assistance information indicates at least one of: an estimated moving direction of the blocking entity relative to the UE; or an estimated velocity of the blocking entity relative to the UE.

In some aspects, the method 700 further includes determining at least one of the estimated moving direction or the estimated velocity based on a series of measurements taken over time. In some aspects, the measurements comprise at least one of RF measurements taken by RF circuitry or sensor measurements taken by one or more sensors. For example, in some cases, the blocking entity's estimated moving direction may be determined, by interpolation, from a change in position over two measurements. The estimated moving direction may be determined by interpolating a directional line from a first measured position to a second measured position of the blocking entity. In such cases, a blocking entity's estimated velocity may be determined by dividing the length of the interpolated line by the duration between the two measurements. In some aspects, the measurements comprise the sensor measurements (e.g., image sensor measurements), and the at least one of the estimated moving direction or estimated velocity is determined based on a series of consecutive images of the blocking entity using the techniques described above.

In some aspects, the at least one of the estimated moving direction or estimated velocity is determined based on an ML algorithm applied to a series of RF measurements over time; and the ML algorithm is trained using measurements of multiple network entity beams taken by RF circuitry over time while a blocking entity moves. In some cases, the ML algorithm may utilize the techniques described above for determining the estimated moving direction or estimated velocity.

In some aspects, the assistance information indicates at least one of: an estimated size, an estimated shape, an estimated type, or an estimated height of the blocking entity. In some cases, these estimated characteristics may be determined based on an ML algorithm. In some cases, these estimated characteristics may be extrapolated based on measurements and/or training data. These estimated characteristics may be used in assigning blockage probabilities to candidate beams. In some cases, dimensions for known objects may be obtained from a database. In such cases, if a UE is able to identify an object, it may retrieve the dimensions from the database. In some cases, an estimated height and/or width of a blocking entity may be considered (along with the blocking entity trajectory) when determining if or when that blocking entity might actually block a transmit and receive beam pair.

Figure 9:
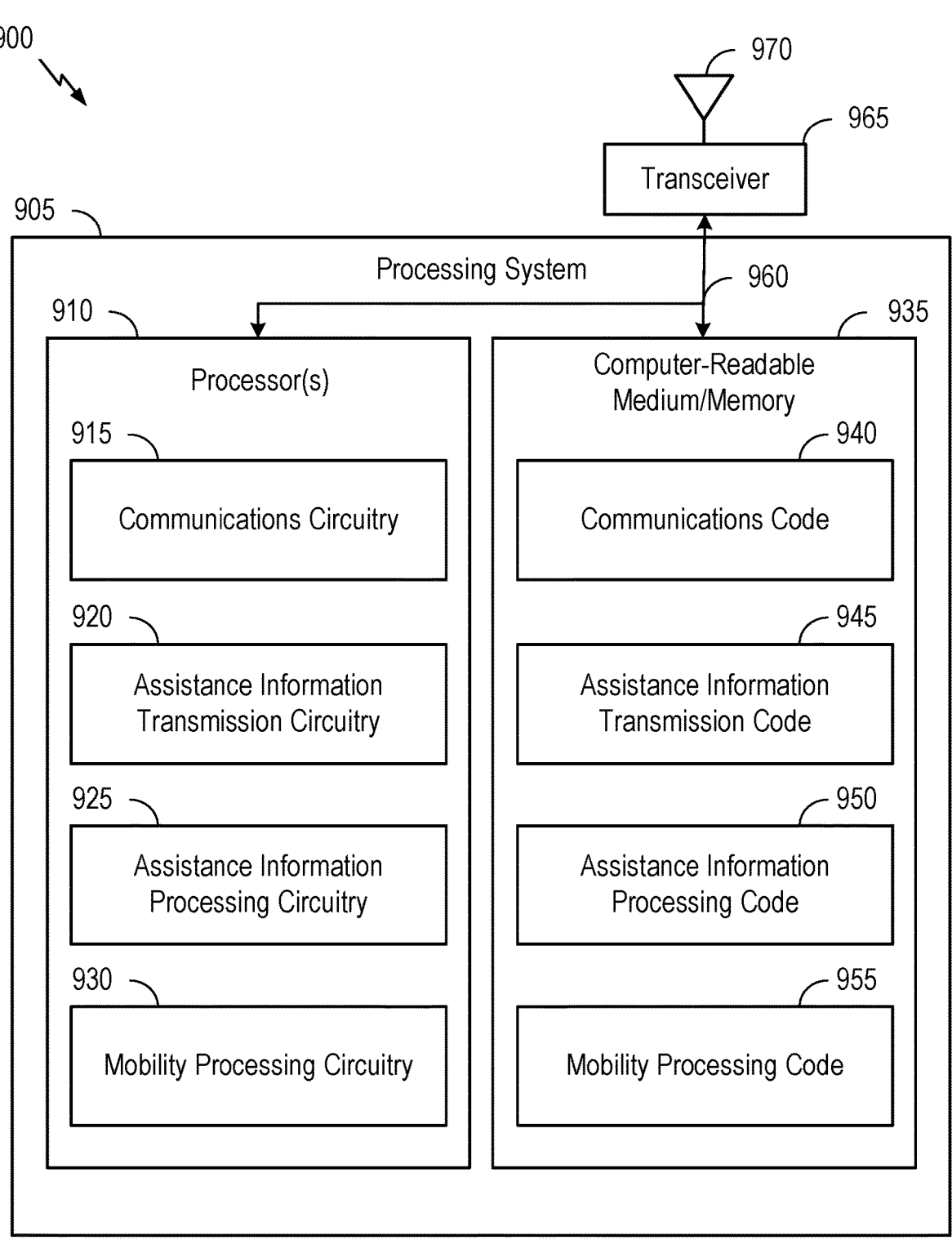
FIG. 9 depicts aspects of an example communications device.

In one aspect, method 700, or any aspect related to it, may be performed by an apparatus, such as communications device 900 of FIG. 9, which includes various components operable, configured, or adapted to perform the method 700. Communications device 900 is described below in further detail.

Note that FIG. 7 is just one example of a method, and other methods including fewer, additional, or alternative steps are possible consistent with this disclosure.

Example Operations of a Network Entity

Figure 8:
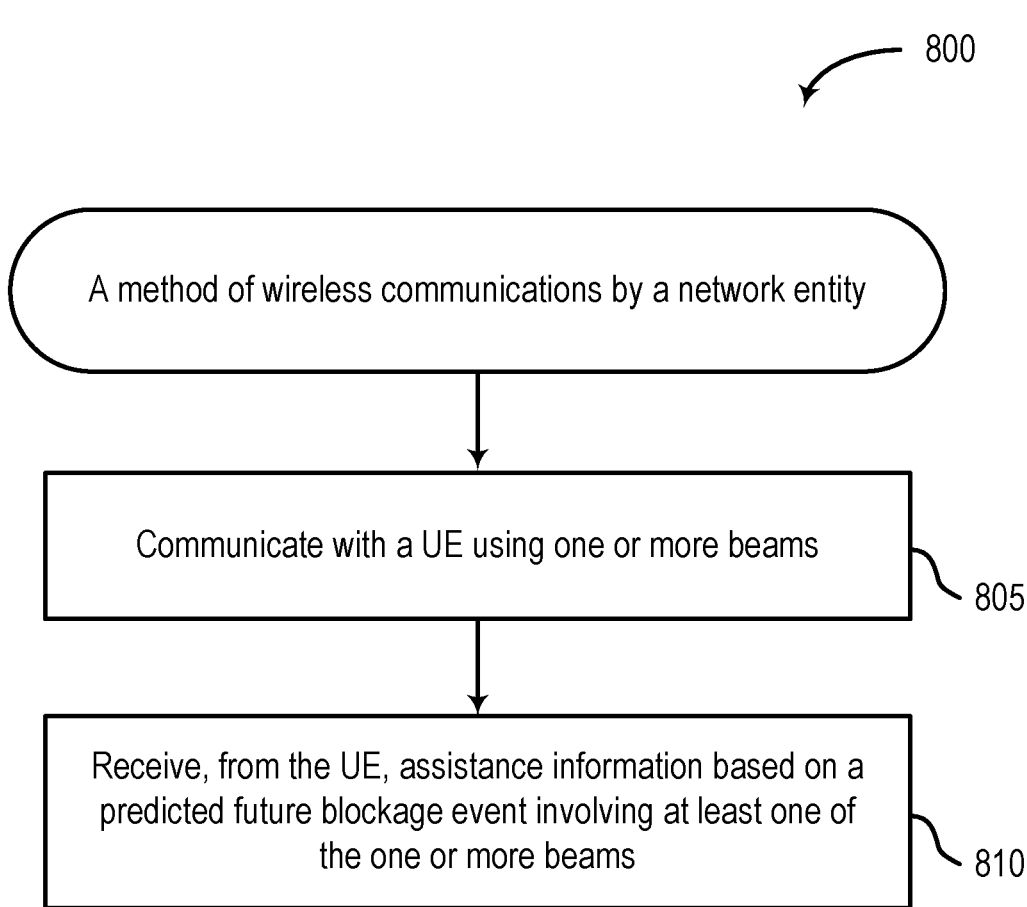
FIG. 8 depicts a method for wireless communications.

FIG. 8 shows a method 800 for wireless communications by a network entity, such as BS 102 of FIGS. 1 and 3, or a disaggregated base station as discussed with respect to FIG. 2.

Method 800 begins at 805 with communicating with a UE using one or more beams. In some cases, the operations of this step refer to, or may be performed by, communications circuitry as described with reference to FIG. 10.

Method 800 then proceeds to step 810 with receiving, from the UE, assistance information based on a predicted future blockage event involving at least one of the one or more beams. In some cases, the operations of this step refer to, or may be performed by, UE assistance information processing circuitry as described with reference to FIG. 10.

In some aspects, the assistance information includes an indication of at least one candidate beam that is predicted to be less impacted by the predicted future blockage event than the one or more beams. In some aspects, the assistance information includes at least one of: a predicted RSRP for the at least one candidate beam; or a calculated blockage probability that the at least one candidate beam will be blocked in the future blockage event.

In some aspects, the method 800 further includes configuring the UE with a threshold for use in selecting the at least one candidate beam based on the calculated blockage probability. For example, the UE may not select (indicate) a candidate beam if the UE determines a calculated blockage probability for that beam exceeds a configured blockage probability threshold. Rather, the UE may select one or more other candidate beams less likely to be blocked in the future.

In some aspects, the method 800 further includes performing a beam switch to the at least one candidate beam. In some aspects, the method 800 further includes communicating with the UE using the at least one candidate beam after the beam switch.

In some aspects, the future blockage event involves movement of at least one blocking entity between the UE and network entity, or movement of the UE such that at least one blocking entity is between the UE and network entity; and the assistance information indicates at least one of an estimated size, an estimated shape, an estimated type, or an estimated height of the blocking entity.

Figure 10:
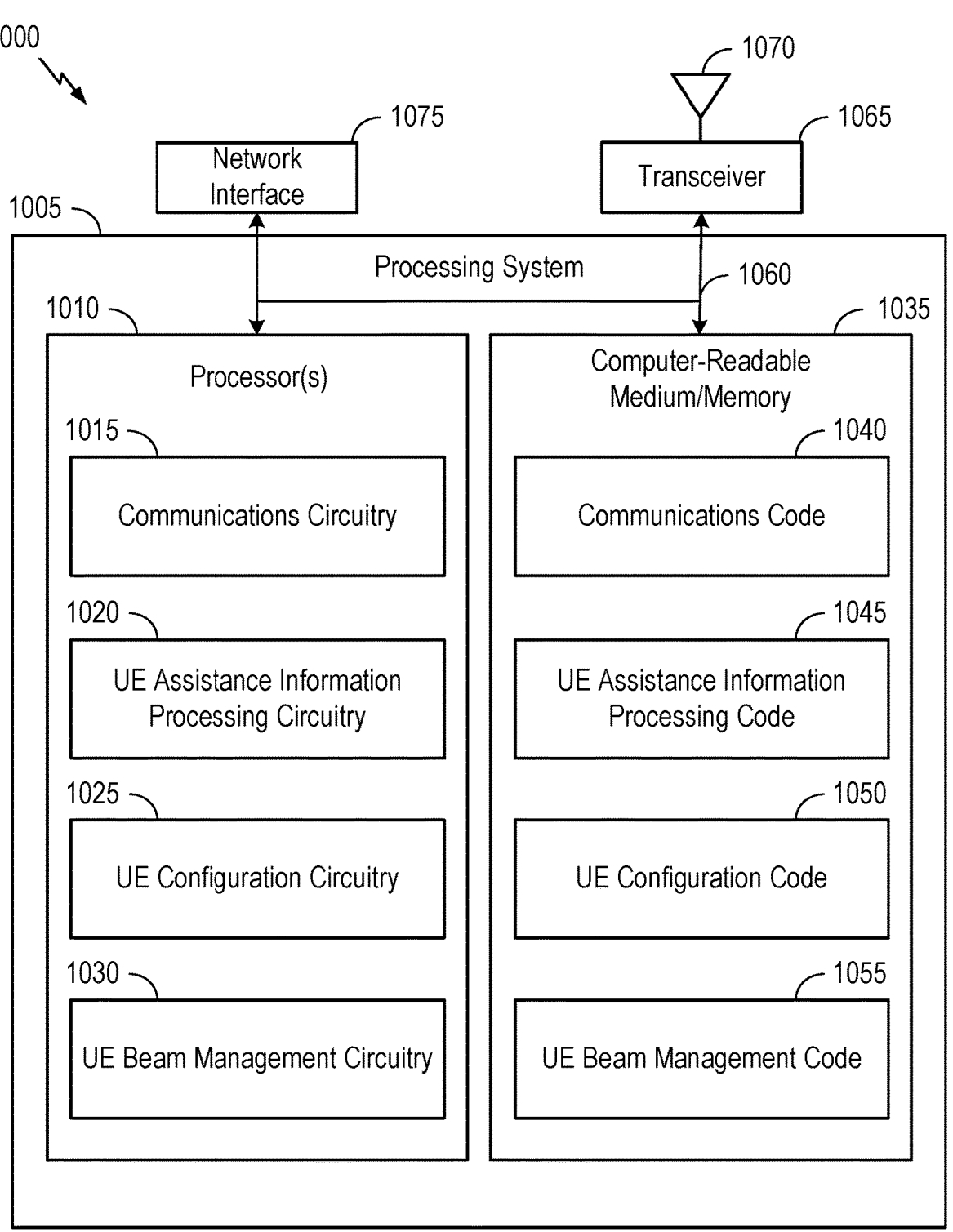
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 905 coupled to the transceiver 965 (e.g., a transmitter and/or a receiver). The transceiver 965 is configured to transmit and receive signals for the communications device 900 via the antenna 970, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 935 via a bus 960. In certain aspects, the computer-readable medium/memory 935 is configured to store instructions (e.g., computer-executable code) that when executed by the one or more processors 910, cause the one or more processors 910 to perform the method 700 described with respect to FIG. 7, or any aspect related to it. Note that reference to a processor performing a function of communications device 900 may include one or more processors 910 performing that function of communications device 900.

In the depicted example, computer-readable medium/memory 935 stores code (e.g., executable instructions), such as communications code 940, assistance information transmission code 945, assistance information processing code 950, and mobility processing code 955. Processing of the communications code 940, assistance information transmission code 945, assistance information processing code 950, and mobility processing code 955 may cause the communications device 900 to perform the method 700 described with respect to FIG. 7, or any aspect related to it.

The one or more processors 910 include circuitry configured to implement (e.g., execute) the code stored in the computer-readable medium/memory 935, including circuitry such as communications circuitry 915, assistance information transmission circuitry 920, assistance information processing circuitry 925, and mobility processing circuitry 930. Processing with communications circuitry 915, assistance information transmission circuitry 920, assistance information processing circuitry 925, and mobility processing circuitry 930 may cause the communications device 900 to perform the method 700 described with respect to FIG. 7, or any aspect related to it.

Various components of the communications device 900 may provide means for performing the method 700 described with respect to FIG. 7, or any aspect related to it. For example, means for transmitting, sending or outputting for transmission may include transceivers 354 and/or antenna(s) 352 of the UE 104 illustrated in FIG. 3 and/or the transceiver 965 and the antenna 970 of the communications device 900 in FIG. 9. Means for receiving or obtaining may include transceivers 354 and/or antenna(s) 352 of the UE 104 illustrated in FIG. 3 and/or the transceiver 965 and the antenna 970 of the communications device 900 in FIG. 9.

According to some aspects, communications circuitry 915 communicates with a network entity using one or more beams. According to some aspects, assistance information transmission circuitry 920 transmits, to the network entity, assistance information based on a predicted future blockage event involving at least one of the one or more beams.

In some aspects, the assistance information includes an indication of at least one candidate beam that is predicted to be less impacted by the predicted future blockage event than the one or more beams. In some aspects, the assistance information includes at least one of: a predicted RSRP for the at least one candidate beam; or a calculated blockage probability that the at least one candidate beam will be blocked in the future blockage event.

According to some aspects, assistance information processing circuitry 925 calculates a blockage probability for the at least one candidate beam. In some examples, assistance information processing circuitry 925 selects the at least one candidate beam for inclusion in the assistance information based on the calculated blockage probability being less than or equal to a threshold. In some aspects, the threshold is configured by a network entity. In some aspects, the future blockage event involves movement of at least one blocking entity.

In some aspects, the assistance information indicates at least one of: an estimated moving direction of the UE relative to the blocking entity; or an estimated velocity of the UE relative to the blocking entity. According to some aspects, mobility processing circuitry 930 determines at least one of the estimated moving direction or the estimated velocity based on a series of measurements taken over time. In some aspects, the measurements comprise at least one of RF measurements taken by RF circuitry or sensor measurements taken by one or more sensors. In some aspects, the measurements comprise the sensor measurements; the sensor measurements comprise image sensor measurements; and the at least one of the estimated moving direction or estimated velocity is determined based on a series of consecutive images of the blocking entity. In some aspects, the at least one of the estimated moving direction or estimated velocity is determined based on an ML algorithm applied to a series of RF measurements over time; and the ML algorithm is trained using measurements of multiple network entity beams taken by RF circuitry over time while a blocking entity moves.

In some aspects, the assistance information indicates at least one of: an estimated size, an estimated shape, an estimated type, or an estimated height of the blocking entity.

FIG. 10 depicts aspects of an example communications device 1000. In some aspects, communications device 1000 is a network entity, such as BS 102 of FIGS. 1 and 3, or a disaggregated base station as discussed with respect to FIG. 2.

The communications device 1000 includes a processing system 1005 coupled to the transceiver 1065 (e.g., a transmitter and/or a receiver) and/or a network interface 1075. The transceiver 1065 is configured to transmit and receive signals for the communications device 1000 via the antenna 1070, such as the various signals as described herein. The network interface 1075 is configured to obtain and send signals for the communications device 1000 via communication link(s), such as a backhaul link, midhaul link, and/or fronthaul link as described herein, such as with respect to FIG. 2. The processing system 1005 may be configured to perform processing functions for the communications device 1000, including processing signals received and/or to be transmitted by the communications device 1000.

The processing system 1005 includes one or more processors 1010. In various aspects, one or more processors 1010 may be representative of one or more of receive processor 338, transmit processor 320, TX MIMO processor 330, and/or controller/processor 340, as described with respect to FIG. 3. The one or more processors 1010 are coupled to a computer-readable medium/memory 1035 via a bus 1060. In certain aspects, the computer-readable medium/memory 1035 is configured to store instructions (e.g., computer-executable code) that when executed by the one or more processors 1010, cause the one or more processors 1010 to perform the method 800 described with respect to FIG. 8, or any aspect related to it. Note that reference to a processor of communications device 1000 performing a function may include one or more processors 1010 of communications device 1000 performing that function.

In the depicted example, the computer-readable medium/memory 1035 stores code (e.g., executable instructions), such as communications code 1040, UE assistance information processing code 1045, UE configuration code 1050, and UE beam management code 1055. Processing of the communications code 1040, UE assistance information processing code 1045, UE configuration code 1050, and UE beam management code 1055 may cause the communications device 1000 to perform the method 800 described with respect to FIG. 8, or any aspect related to it.

The one or more processors 1010 include circuitry configured to implement (e.g., execute) the code stored in the computer-readable medium/memory 1035, including circuitry such as communications circuitry 1015, UE assistance information processing circuitry 1020, UE configuration circuitry 1025, and UE beam management circuitry 1030. Processing with communications circuitry 1015, UE assistance information processing circuitry 1020, UE configuration circuitry 1025, and UE beam management circuitry 1030 may cause the communications device 1000 to perform the method 800 as described with respect to FIG. 8, or any aspect related to it.

Various components of the communications device 1000 may provide means for performing the method 800 as described with respect to FIG. 8, or any aspect related to it. Means for transmitting, sending or outputting for transmission may include transceivers 332 and/or antenna(s) 334 of the BS 102 illustrated in FIG. 3 and/or the transceiver 1065 and the antenna 1070 of the communications device 1000 in FIG. 10. Means for receiving or obtaining may include transceivers 332 and/or antenna(s) 334 of the BS 102 illustrated in FIG. 3 and/or the transceiver 1065 and the antenna 1070 of the communications device 1000 in FIG. 10.

According to some aspects, communications circuitry 1015 communicates with a UE using one or more beams. According to some aspects, UE assistance information processing circuitry 1020 receives, from the UE, assistance information based on a predicted future blockage event involving at least one of the one or more beams.

In some aspects, the assistance information includes an indication of at least one candidate beam that is predicted to be less impacted by the predicted future blockage event than the one or more beams. In some aspects, the assistance information includes at least one of: a predicted RSRP for the at least one candidate beam; or a calculated blockage probability that the at least one candidate beam will be blocked in the future blockage event.

According to some aspects, UE configuration circuitry 1025 configures the UE with a threshold for use in selecting the at least one candidate beam based on the calculated blockage probability.

According to some aspects, UE beam management circuitry 1030 performs a beam switch to the at least one candidate beam. In some examples, communications circuitry 1015 communicates with the UE using the at least one candidate beam. In some aspects, the future blockage event involves movement of at least one blocking entity; and the assistance information indicates at least one of an estimated size, an estimated shape, an estimated type, or an estimated height of the blocking entity.

22

Example Clauses

Implementation examples are described in the following numbered clauses:

Clause 1: A method of wireless communication by a UE, comprising: communicating with a network entity using one or more beams; and transmitting, to the network entity, assistance information based on a predicted future blockage event involving at least one of the one or more beams.

Clause 2: The method of Clause 1, wherein the assistance information includes an indication of at least one candidate beam that is predicted to be less impacted by the predicted future blockage event than the one or more beams.

Clause 3: The method of Clause 2, wherein the assistance information includes at least one of: a predicted RSRP for the at least one candidate beam; or a calculated blockage probability that the at least one candidate beam will be blocked in the future blockage event.

Clause 4: The method of Clause 2, further comprising: calculating a blockage probability for the at least one candidate beam; and selecting the at least one candidate beam for inclusion in the assistance information based on the calculated blockage probability being less than or equal to a threshold.

Clause 5: The method of Clause 4, wherein the threshold is configured by a network entity.

Clause 6: The method of any one of Clauses 1-5, wherein the future blockage event involves movement of at least one blocking entity relative to the UE, movement of the UE relative to the at least one blocking entity, or movements of the UE and the at least one blocking entity relative to each other.

Clause 7: The method of Clause 6, wherein the assistance information indicates at least one of: an estimated moving direction of the UE and blocking entity relative to each other; or an estimated velocity of the UE and the blocking entity relative to each other.

Clause 8: The method of Clause 7, further comprising: determining at least one of the estimated moving direction or the estimated velocity based on a series of measurements taken over time.

Clause 9: The method of Clause 8, wherein the measurements comprise at least one of RF measurements taken by RF circuitry or sensor measurements taken by one or more sensors.

Clause 10: The method of Clause 9, wherein: the measurements comprise the sensor measurements; the sensor measurements comprise image sensor measurements; and the at least one of the estimated moving direction or estimated velocity is determined based on a series of consecutive images of the blocking entity.

Clause 11: The method of Clause 9, wherein: the at least one of the estimated moving direction or estimated velocity is determined based on an ML algorithm applied to a series of RF measurements over time; and the ML algorithm is trained using measurements of multiple network entity beams taken by RF circuitry over time while a blocking entity moves.

Clause 12: The method of Clause 6, wherein: the assistance information indicates at least one of: an estimated size, an estimated shape, an estimated type, or an estimated height of the blocking entity.

Clause 13: A method of wireless communications by a network entity, comprising: communicating with a UE using one or more beams; and receiving, from the UE, assistance information based on a predicted future blockage event involving at least one of the one or more beams.

Clause 14: The method of Clause 13, wherein the assistance information includes an indication of at least one candidate beam that is predicted to be less impacted by the predicted future blockage event than the one or more beams.

Clause 15: The method of Clause 14, wherein the assistance information includes at least one of: a predicted RSRP for the at least one candidate beam; or a calculated blockage probability that the at least one candidate beam will be blocked in the future blockage event.

Clause 16: The method of Clause 14, further comprising: configuring the UE with a threshold for use in selecting the at least one candidate beam based on the calculated blockage probability.

Clause 17: The method of Clause 14, further comprising: performing a beam switch to the at least one candidate beam; and communicating with the UE using the at least one candidate beam after performing the beam switch.

Clause 18: The method of any one of Clauses 13-17, wherein: the future blockage event involves movement of at least one blocking entity relative to the UE, movement of the UE relative to the at least one blocking entity, or movements of the UE and the at least one blocking entity relative to each other.

Clause 19: A processing system, comprising: a memory comprising computer-executable instructions; one or more processors configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium comprising computer-executable instructions that, when executed by one or more processors of a processing system, cause the processing system to perform a method in accordance with any one of Clauses 1-18.

Clause 22: A computer program product embodied on a computer-readable storage medium comprising code for performing a method in accordance with any one of Clauses 1-18.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:

at least one memory comprising instructions; and one or more processors configured to execute the instructions and cause the UE to:

communicate with a network entity using one or more beams;

predict a future blockage event involving blockage of a path of at least one of the one or more beams; and transmit, to the network entity, assistance information indicating:

the predicted future blockage event; and at least one candidate beam that is predicted to be less impacted by the predicted future blockage event than the one or more beams, wherein the at least one candidate beam comprises a candidate beam that has:

a first reference signal received power (RSRP) predicted to be greater than or equal to a target RSRP threshold when the predicted future blockage event occurs; and a blockage probability less than or equal to a blockage probability threshold after the predicted future blockage event.

2. The apparatus of claim 1, wherein:

the assistance information indicates an estimated size, an estimated shape, an estimated type, and an estimated height of a blocking entity associated with the predicted future blockage event.

3. The apparatus of claim 1, wherein the assistance information includes at least one of:

the predicted first RSRP associated with the at least one candidate beam; or the blockage probability associated with the at least one candidate beam.

4. The apparatus of claim 1, wherein the one or more processors are further configured to cause the UE to:

calculate the blockage probability associated with the at least one candidate beam; and select the at least one candidate beam for inclusion in the assistance information based on the calculated blockage probability being less than or equal to the blockage probability threshold.

5. The apparatus of claim 4, wherein the blockage probability threshold is configured by a network entity.

6. The apparatus of claim 1, wherein:

the predicted future blockage event involves movement of at least one blocking entity relative to the UE, movement of the UE relative to the at least one blocking entity, or movements of the UE and the at least one blocking entity relative to each other.

7. The apparatus of claim 6, wherein the assistance information indicates at least one of: an estimated moving direction of the UE and blocking entity relative to each other; or an estimated velocity of the UE and the blocking entity relative to each other.

8. The apparatus of claim 7, wherein the one or more processors are further configured to cause the UE to: determine at least one of the estimated moving direction or the estimated velocity based on a series of measurements taken over time.

9. The apparatus of claim 8, wherein the measurements comprise at least one of radio frequency (RF) measurements taken by RF circuitry or sensor measurements taken by one or more sensors.

10. The apparatus of claim 9, wherein:

the measurements comprise the sensor measurements;

the sensor measurements comprise image sensor measurements; and the at least one of the estimated moving direction or estimated velocity is determined based on a series of consecutive images of the blocking entity.

11. The apparatus of claim 9, wherein the one or more processors are further configured to cause the UE to:

determine the at least one of the estimated moving direction or estimated velocity based on a machine learning (ML) algorithm applied to a series of RF measurements over time; and train the ML algorithm using measurements of multiple network entity beams taken by RF circuitry over time while a blocking entity moves.

12. The apparatus of claim 6, wherein the assistance information indicates at least one of:

an estimated size; an estimated shape; an estimated type; or an estimated height of the blocking entity.

13. An apparatus for wireless communication at a network entity, comprising:

at least one memory comprising instructions; and one or more processors configured to execute the instructions and cause the network entity to:

communicate with a user equipment (UE) using one or more beams; and receive, from the UE, assistance information indicating:

a predicted future blockage event involving blockage of a path of at least one of the one or more beams; and at least one candidate beam that is predicted to be less impacted by the predicted future blockage event than the one or more beams, wherein the at least one candidate beam comprises a candidate beam that has:

a first reference signal received power (RSRP) predicted to be greater than or equal to a target RSRP threshold when the predicted future blockage event occurs; and a blockage probability less than or equal to a blockage probability threshold after the predicted future blockage event.

14. The apparatus of claim 13, wherein:

the assistance information indicates an estimated size, an estimated shape, an estimated type, and an estimated height of a blocking entity associated with the predicted future blockage event.

15. The apparatus of claim 13, wherein the assistance information includes at least one of:

the predicted first RSRP associated with the at least one candidate beam; or the blockage probability associated with the at least one candidate beam.

16. The apparatus of claim 13, wherein the one or more processors are further configured to cause the network entity to configure the UE with the blockage probability threshold for use in selecting the at least one candidate beam based on the calculated blockage probability.

17. The apparatus of claim 13, wherein the one or more processors are further configured to and cause the network entity to:

perform a beam switch to the at least one candidate beam; and communicate with the UE using the at least one candidate beam after performing the beam switch.

18. The apparatus of claim 13, wherein:

the predicted future blockage event involves movement of at least one blocking entity relative to the UE, movement of the UE relative to the at least one blocking entity, or movements of the UE and the at least one blocking entity relative to each other.

19. A method for wireless communication at a user equipment (UE), comprising:

communicating with a network entity using one or more beams;

predicting a future blockage event involving blockage of a path of at least one of the one or more beams; and transmitting, to the network entity, assistance information indicating:

the predicted future blockage event; and at least one candidate beam that is predicted to be less impacted by the predicted future blockage event than the one or more beams, wherein the at least one candidate beam comprises a candidate beam that has:

a first reference signal received power (RSRP) predicted to be greater than or equal to a target RSRP threshold when the predicted future blockage event occurs; and a blockage probability less than or equal to a blockage probability threshold after the predicted future blockage event.

20. A method for wireless communication at a network entity, comprising:

communicating with a user equipment (UE) using one or more beams; and receiving, from the UE, assistance information indicating:

a predicted future blockage event involving blockage of a path of at least one of the one or more beams; and at least one candidate beam that is predicted to be less impacted by the predicted future blockage event than the one or more beams, wherein the at least one candidate beam comprises a candidate beam that has:

a first reference signal received power (RSRP) predicted to be greater than or equal to a target RSRP threshold when the predicted future blockage event occurs; and a blockage probability less than or equal to a blockage probability threshold after the predicted future blockage event.

* * * * *